Jan. 18, 1927.  J. T. MURPHY ET AL  1,614,486
BEATING ENGINE
Filed Sept. 11, 1920    5 Sheets-Sheet 1

Inventors:
James T. Murphy
Edward J. Raney

Jan. 18, 1927.          1,614,486
J. T. MURPHY ET AL
BEATING ENGINE
Filed Sept. 11, 1920     5 Sheets-Sheet 3

Inventors:
James T. Murphy
Edward J. Raney

Jan. 18, 1927. 1,614,486
J. T. MURPHY ET AL
BEATING ENGINE
Filed Sept. 11, 1920  5 Sheets-Sheet 4

Inventors:
James T. Murphy
Edward J. Raney
William Bradbury
See & McCaleb Attys

Jan. 18, 1927.  1,614,486
J. T. MURPHY ET AL
BEATING ENGINE
Filed Sept. 11, 1920    5 Sheets-Sheet 5
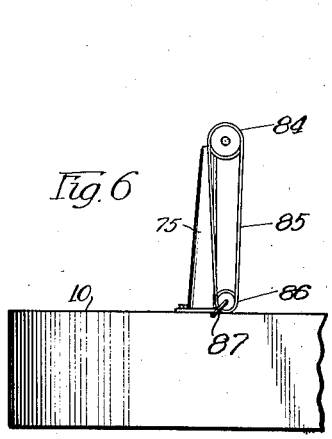
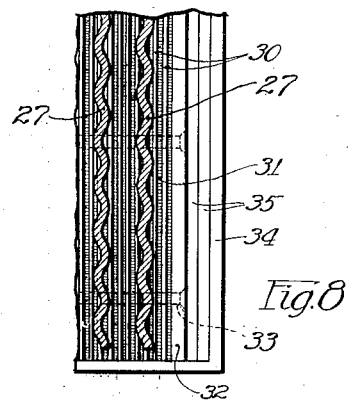
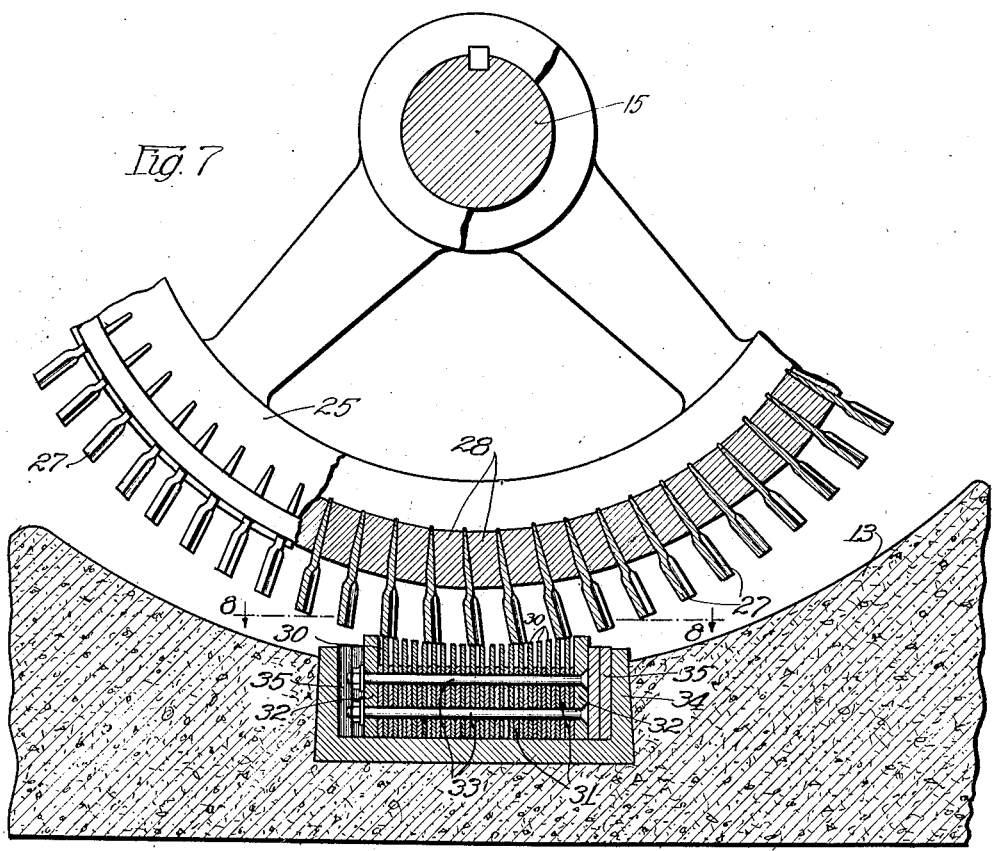
Inventors
James T. Murphy
Edward J. Raney Patented Jan. 18, 1927.

1,614,486

UNITED STATES PATENT OFFICE.

JAMES T. MURPHY AND EDWARD J. RANEY, OF CHICAGO, ILLINOIS, ASSIGNORS, BY MESNE ASSIGNMENTS, OF ONE-THIRD TO CHICAGO MILL AND LUMBER COMPANY, OF CHICAGO, ILLINOIS, A CORPORATION OF ILLINOIS.

BEATING ENGINE.

Application filed September 11, 1920. Serial No. 409,551.

Our invention relates to improvements in beating engines, for the manufacture of paper pulp, and is especially concerned with the production of a novel type of beating engine by means of which a considerably larger output of paper pulp can be obtained than by the use of the beating engines now commonly employed in the paper industry.

Further objects of our invention are:

First: To provide a beating engine comprising a plurality of beater rolls arranged in series, the beater rolls being so adjusted relative to their respective bed plates that the paper stock is reduced to a finer state of sub-division as it passes beneath successive beater rolls.

Second: To provide a beating engine of the character described comprising means positioned in advance of the initial beater roll and preferably in advance of each beater roll, for removing the formed stock from the surface of the water circulating in the beating engine.

Third: To provide a beating engine of the character described to which the paper stock can be continuously supplied and the formed paper stock continuously removed.

Fourth: To provide an improved and novel means for continuously removing the formed paper stock from the beating engine.

Fifth: To provide novel means for raising and lowering and for driving the means for continuously removing the stock from the beating engine.

Sixth: To provide a beating engine comprising novel means for softening the paper stock before it passes through the initial or breaker roll, this means further serving to direct and feed the paper stock beneath the initial beater roll.

Seventh: To provide a beating engine comprising a beater roll and a bed plate therefor, which coact in a novel manner to keep the blades of the beater roll in a sharpened condition; and Eighth: To provide a novel bed plate for the beater roll of a beating engine.

Further objects will appear as this description progresses, reference being had to the accompanying drawings, in which—

Figure 5 is an enlarged sectional detail taken on the line 5—5, Figure 2;

Figure 6 is a side elevation of our improved beating engine, portions thereof being broken away, showing part of the means which we employ for raising and lowering the means for removing pulp from the beating engine;

Figure 7 is an enlarged sectional detail showing details of construction of the beater roll and our improved bed plate therefor; and Figure 8 is an enlarged sectional detail taken on the line 8—8, of Figure 7.

Throughout the several views, similar reference characters will be used for referring to similar parts.

Figure 1:
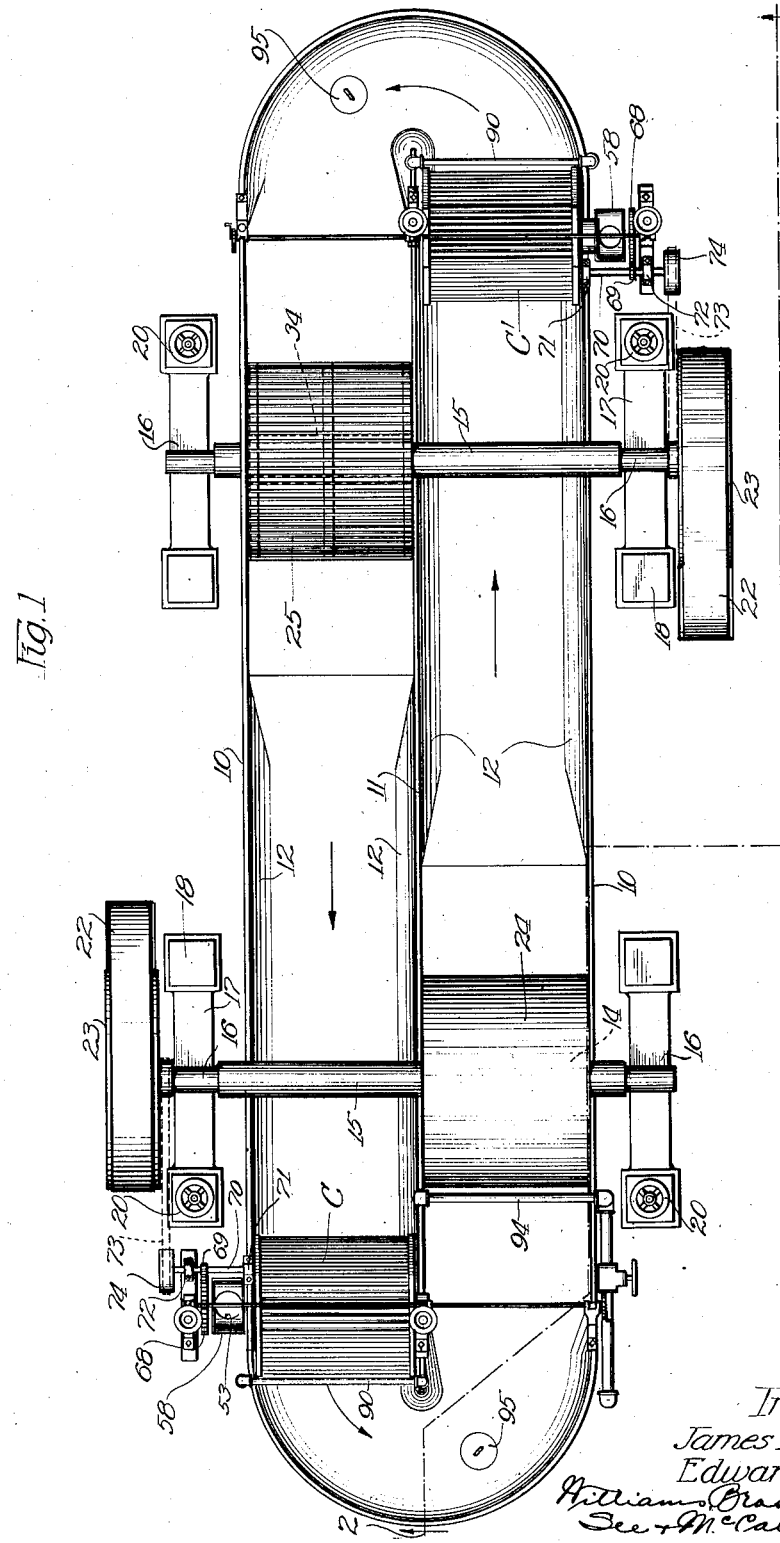
Figure 1 is a plan view of our improved beating engine.
Figure 2:
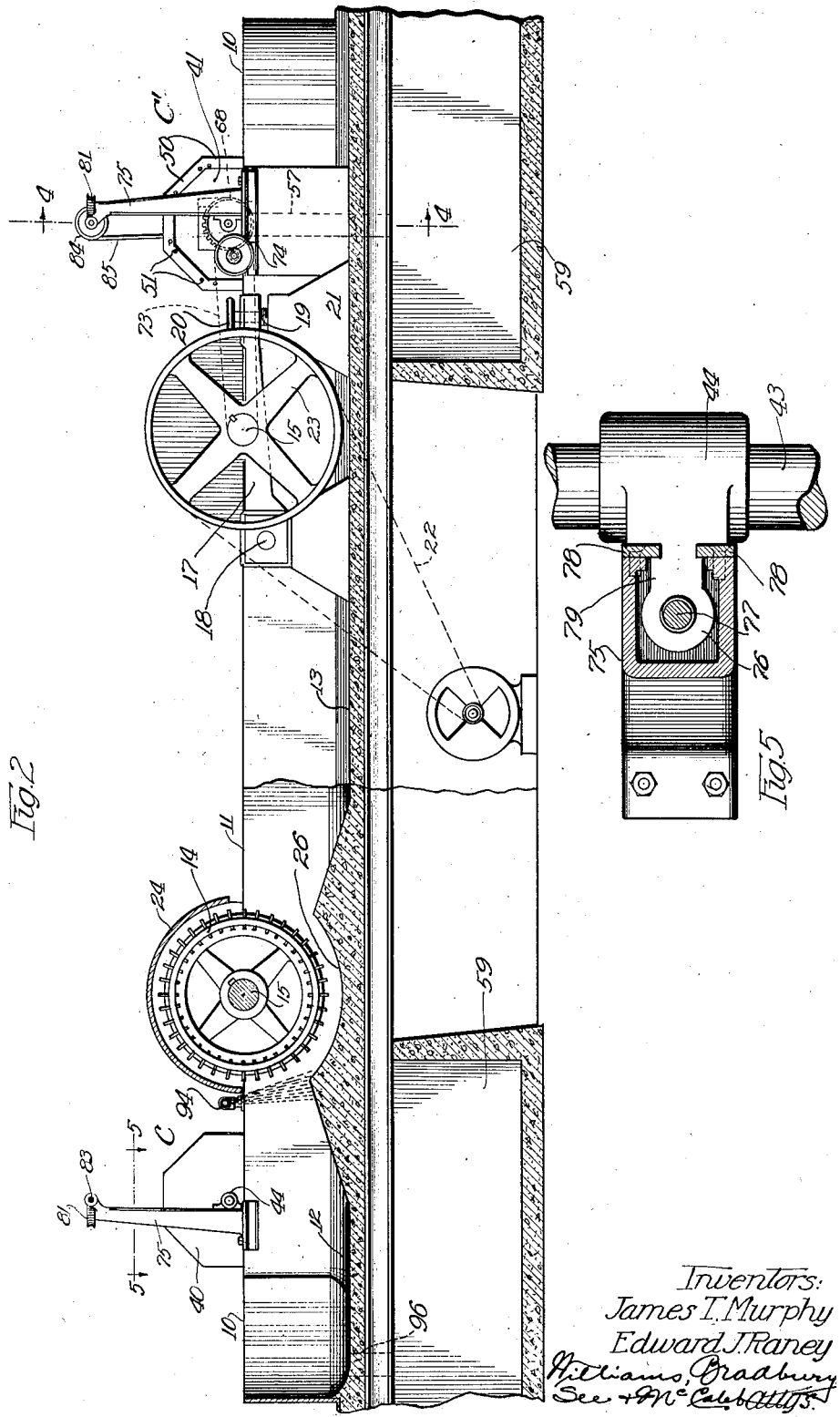
Figure 2 is a side elevation, partly in central longitudinal section, portions of the engine being broken away, along the line 2—2 of Figure 1.

Referring for the present to Figures 1 and 2, the reference character 10 indicates the wall of the tank of our improved beating engine, which is divided longitudinally by the midboard 11 to form a circuitous path for the water and paper pulp in the usual manner. Fillets 12 are provided at the corners formed by the lower edge of the sides 10 and the bottom 13 of the tank, to properly direct the paper stock as it flows through the tank. Adjacent to one end of the tank, we provide an initial beater roll 14 which will hereinafter, for the sake of convenience, be designated as a breaker roll and which is mounted upon a shaft 15, journaled in bearings 16 which are in turn mounted upon the adjusting levers 17. The levers 17 are pivoted at 18 and the opposite ends thereof are provided with two screws 19, operable by the hand wheels 20. The lower ends of the screws 19 bear upon the pedestals 21. By means of the construction just described, the breaker roll can be raised and lowered merely by turning the hand wheels 20 in opposite directions. The breaker roll is operated preferably by an electric motor, which is shown connected with the shaft 15 by means of the belt 22 and belt pulley 23. A cover 24 may be provided for the breaker roll 14. At the opposite end of the beating engine, and on the opposite side of the midboard, we provide a second beater roll 25, the function of which is to grind the paper stock which is initially disintegrated by the breaker roll 14. The beater roll 25 is adaptably mounted in the same manner as the breaker roll 14, and can be driven in the same manner. Further description of its mountings and the means for driving it will, therefore, be omitted.

It will be noted from inspection of Figure 2, that the breaker roll is provided with a plurality of blades which extend longitudinally of the roll in the well known manner, and that the edges of these blades are spaced a very substantial distance from the bed plate 26 which is formed by extending the bottom of the tank upwardly and providing it with a cylindrical depression roughly conforming to the periphery of the breaker roll.

By reference to Figures 7 and 8, it will be seen that the construction of the beater roll 25 differs materially from the construction of the breaker roll, in that it comprises a larger number of blades 27 which are transversely corrugated. The blades are held in place by means of a plurality of wooden strips 28, inserted between the adjacent blades in a well known manner. It will of course, be understood that the ends of the blades 27 are secured by means of metal bands in a manner well known to those skilled in this art.

Our improved bed plate for the beater roll comprises a plurality of thin straight steel bars 30, which are held in spaced relation by means of thin strips 31 of wood or other material having the property of expanding by the absorption of water. The bars 30 and the strips 31 are held in assembled relation by means of the side bars 32, and the bolts 33. The ensemble thus formed is secured in a trough-shaped container 34 of cast iron or other suitable material, molded into the bottom of the tank, by means of strips 35 of wood or other material which expands when saturated with water.

In use, the beater roll 25 is adjusted downwards until the outer edges of its blades coact with the upper edges of the steel bars 30 to grind the paper stock or partially formed pulp between the edges of the blades and the bars. The roll 25 may therefore be designated as a grinder roll. We preferably form the bars 30 of harder metal than the metal from which the blades 27 are formed, thereby causing continuous abrading action between the bars 30 and the blades 27 which keeps the blades in a sharpened condition.

We have also discovered that a better grinding action is obtained if the strips 31 are made narrower than the bars 30 so that the upper edges of these bars project freely beyond the upper edges of the spacing strips.

We prefer to make the tank of our improved beating engine considerably longer than the tanks of the beating engines at present in use, so that a comparatively long interval of time will ensue between the passage of the paper stock beneath the breaker roll and its subsequent passage between the beater roll 25 and its bed plate. In this manner, the paper stock remains in contact with the water a sufficient length of time to very considerably soften it prior to its passage between the beater roll and its bed plate, thereby insuring a uniform product and decreasing the amount of power required for driving the beater roll.

After the stock passes beneath the beater roll, the greater portion thereof is in condition to be removed from the engine and for this purpose we have provided a means which, for the present, will be indicated by the reference character C, which is so constructed as to continuously remove the formed pulp from the beating engine. This apparatus is so constructed that it selectably removes the pulp which has been ground to a proper degree of fineness, but rejects the coarser material, which passes along the tank with the current of water produced by the beater roll, and for the second time passes under the breaker roll along with the new paper stock which is being continuously fed to the beating engine.

Between the removing apparatus C and the grinder roll there is a separation of completely formed paper pulp from the heavier particles of pulp and paper stock, and for preventing this completely formed stock from again passing beneath the beater roll and thus lessening its capacity, we provide a second apparatus C' for continuously removing paper pulp from the engine which is located intermediate the breaker and beater rolls.

We shall now describe the details of construction of our improved means for continuously removing the finished paper pulp from the beating engine. This construction embodies several improvements over the similar apparatus described and claimed in our Patent #1,310,628 of July 22, 1919. This apparatus comprises a drum having the two heads or end members 40 and 41 respectively, which are polygonal in form and preferably made from cast iron. The head or end member 40 is rigidly secured by a key 42, or in any other suitable manner, to the shaft 43, which is rotatably mounted in the bearing blocks 44 and 45, which will be referred to in detail later on. The head 41 is secured to the flange 41ª of the discharge spout 41' by means of bolts 41ᵇ. The discharge spout 41' is keyed to the shaft 43 by means of a key 42'. Surrounding the shaft 43, and concentric therewith, is a conical discharge drum or member 46, the small end of which is keyed to the shaft 43 by a key 47, the larger end of which is supported by an inwardly extending, annular flange 48 formed on the inside of the head 40.

The periphery of the drum is formed of a plurality of sections 49 of metal pipe, these pipes being so secured in the end members as to follow the edges of the heads and thus produce a drum or cylinder having a polygonal periphery. For the purpose of expediting the securing of the pipe sections 49 to, and removing them from the drum, we provide the head 41 with a plurality of openings extending therethrough, through which the pipes can be inserted. The ends of the pipe sections 49 remote from the head 41 are received in suitably formed bores which extend only part way through the head 40. For holding the pipe sections in place, we provide a series of plates 50 which we hold in place by means of screws or bolts 51 (see Figure 2).

A plurality of partitions 52 extend outwardly from the conical-shaped deflector 46, the ends of these partitions being received in channel-shaped members 53, secured to the outer periphery of the deflector 46. Plates 54 are arranged to extend at an angle to the partitions 52, and each of these plates has one edge contacting with the outer edge of the partitions 52, so that together, the partitions 52 and the plates 54 constitute scoops opening in the direction of rotation of the drum, as is indicated by the large arrow in Figure 3, which pick up the pulp entering the drum between the pipe sections. As the drum rotates so as to bring first the plates 54 and then the partitions 52 into positions inclined downwardly, the pulp picked up by the scoops slides down upon the deflector 46 and thence through the openings 55 between the spokes 56 which support the annular discharge spout 41'. It sometimes happens that the pulp sticks to the partitions and does not discharge through the discharge openings at the time when it should normally. To insure the discharge of this pulp, we cut away the ends of the alternate partitions 52 as shown at 52', Figure 4, so that as the partitions rotate past the vertical position, the pulp can drop through this opening and thus discharge through the outlet. The pulp thus discharged drops through the downtake 57, through the opening 58 (see Figure 1) in the floor, and into the vat 59 (see Figure 2). The upper end of the downtake 57 is provided with a head having an annular flange 60 that surrounds the discharge spout 41' so that the downtake will move up and down with the drum as the latter is raised and lowered by means about to be described. In the position shown in Figure 4, the discharge spout 41' rests in a circular depression in the upper edge of the side wall of the tank, and for preventing the pulp and water flowing outwardly through this depression when the drum is raised, we secure an outwardly extending flange 61 to the discharge spout which moves up and down therewith.

Figure 3:
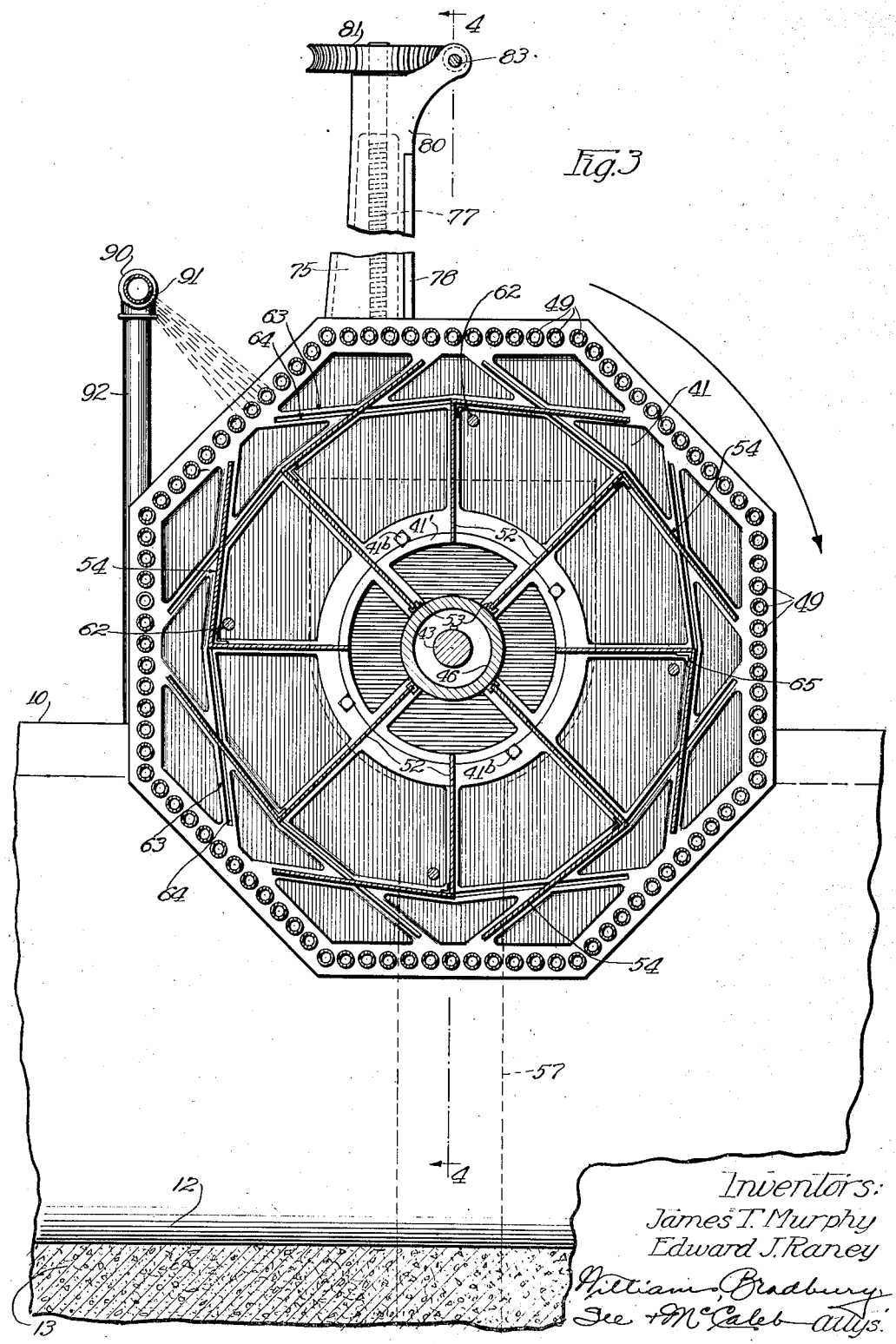
Figure 3 is an enlarged sectional detail showing certain features of construction of our improved means for continuously removing paper pulp from the beating engine, this section being taken substantially on the line 3—3, Figure 4.
Figure 4:
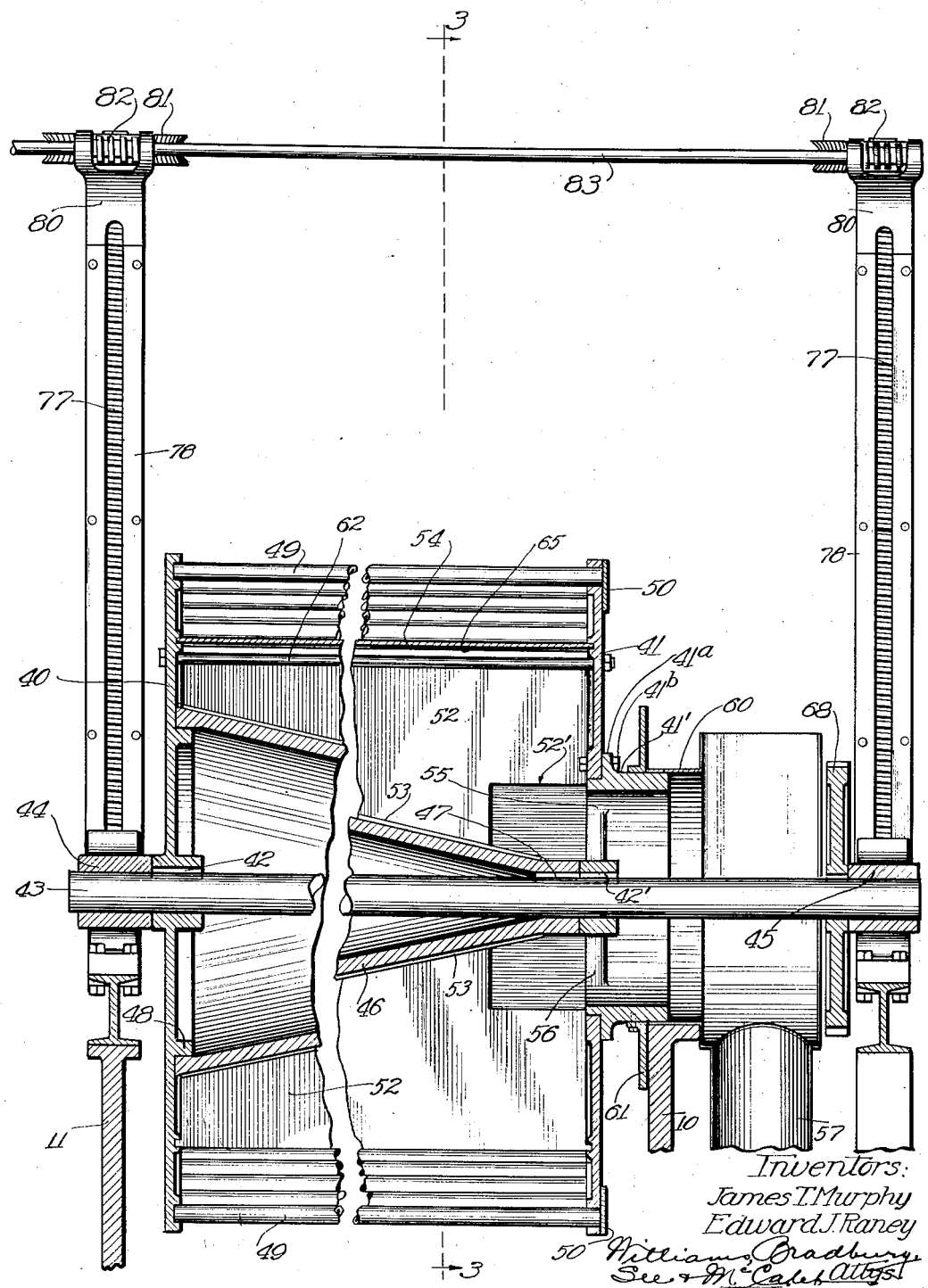
Figure 4 is a transverse section through our improved beating engine, substantially on the line 4—4, Figure 3.

The heads 40 and 41 are held together against the ends of the partitions 52 and the plates 54 by means of the tie rods 62. It will be noted that the inner sides of the heads are provided with a plurality of properly arranged ribs 63 having grooves 64 formed therein for receiving the ends of the partitions 52 and plates 54. In some places the ribs and grooves are duplicated to extend in opposite directions from those which are shown in Figure 3 as being occupied by the ends of the partitions or plates. This is for the purpose of re-arranging the partitions and plates relatively to the heads or end members, so as to be able to form a drum which will remove pulp from the beating engine while rotating in the opposite direction. If desired, the joints between the partitions and plates can be reinforced and sealed by means of angle strips 65. We prefer to form the partitions 52 and the plates 54 of sheet metal, but our invention is not of course, to be limited to the use of this material for this purpose.

We shall now discuss the means by which we drive the pulp remover from the engine. This means comprises a gear 68 which is keyed or otherwise secured to the shaft 43, and which is driven by means of the pinion 69 (see Figure 1). The pinion 69 is mounted upon a shaft 70 having bearings 71 and 72. The shaft 70 is driven from the shaft 15 by means of the belt 73 and the belt pulley 74.

For raising and lowering the pulp removing drum, we provide vertical, U-shaped guides 75, the lower ends of which are suitably supported adjacent the ends of the shaft 43. These guides receive the extensions 76 of the bearing blocks 44 for the shaft 43. These extensions 76 have vertical screw-threaded bores extending therethrough for receiving the vertically extending screws 77. The extensions 76 are held in place in the U-shaped guides 75 by means of the removable plates or strips 78, the inner opposed edges of which are received by slots formed in the sides of the neck 79 of the extension. The upper ends of the guides 75 are provided with bearing blocks 80 for the upper ends of the screws 77. The upper ends of the screws 77 have secured thereto, the worm wheels 81 which are engaged by the worms 82 secured to the opposite ends of the shaft 83. The shaft 83 has a sprocket wheel 84 (see Figure 6), secured to one end thereof, which is connected by the chain 85 with a second sprocket wheel 86 rotatably mounted adjacent the lower end of one of the guides 75. The sprocket 86 may be rotated by means of a handle 87. By rotating the handle 87 in one direction, the drum may be raised, and by rotating it in the opposite direction, the drum can be lowered.

As the drum is gradually moved upwardly, the teeth of the gear 69 gradually move out of contact with the pinion 68 until a point is reached where the pinion 69 is no longer in driving relation with the gear. If the beating engine is in operation, the pulp removing drum will not cease to rotate by reason of this disengagement between the pinion 69 and the gear 68, but will continue to rotate due to the impact of the water and pulp flowing in the tank against the flat sides of the drum. There will, therefore, be no interruption in the discharge of pulp from the beating engine. This is of particular advantage when the engine is being operated to produce pulp at less than its maximum capacity. We wish to state here that there is a distinct advantage in using a drum having polygonal shaped sides, as we have found that as the flat sides enter the pulp and water, they create an impact or disturbance which has the effect of forcing all finished pulp through the pipe sections or bars forming the periphery of the drum, and this increases the rate at which the pulp is discharged from the engine, thereby, to a certain extent, increasing the capacity of the engine.

For the purpose of clearing the spaces between the pipe sections 49 and for removing any strings or rags which may become lodged upon these pipe sections or bars, we provide a pipe 90, which extends longitudinally of the drum and is provided with a plurality of jet openings 91, through which water can be forced in the form of jets onto the periphery of the drum. The pipe 90 can be connected by a pipe 92 with any suitable supply of water under pressure. Preferably this water should be heated. It will, however, be understood that other fluids besides water can, if desired, be used for this purpose.

Difficulty has heretofore been experienced in causing the paper stock to be properly directed beneath the breaker roll. We have discovered that this can be easily accomplished by directing jets of water from a pipe 94 onto the paper stock just before it comes into contact with the breaker roll. These jets of water should preferably be heated to cause a preliminary softening of the paper stock before it encounters the breaker roll.

The reference characters 95 denote cover plates for openings 96 in the bottom of the beating engine, through which the tank can be drained whenever desired. These openings may if desired, be used for removing the paper pulp from the engine in place of the continuous removing devices C and C', but when the pulp is thus removed, the beating engine must necessarily operate on the intermittent principle.

While we have described the details of construction of the preferred embodiment of our invention, it should be clearly understood that our invention is not to be limited to these details, but is capable of other adaptations and modifications within the scope of the appended claims.

We particularly desire to point out that although we have shown but two beater rolls arranged in series, it is possible and in some cases desirable, to use a greater number of beater rolls. When a greater number of beater rolls are employed, they will be so adjusted relatively to their bed plates that the reduction of the paper stock to paper pulp will be accomplished gradually in passing from the first or breaker roll to the last or grinder roll—that is, each beater roll progressing from the breaker roll to the grinder roll, will be adjusted slightly closer to its bed plate than the preceding roll.

Furthermore, where more than two beater rolls are employed, we prefer to correspondingly increase the number of devices for removing the pulp from the beating engine so that each beater roll will be preceded by pulp removing apparatus, thereby insuring that each roll will operate at its maximum efficiency.

Having thus described our invention, what we claim is:

1. The combination with a beating engine comprising a tank through which the water and stock flows, of a plurality of beater rolls arranged in series in said tank, bed plates for said beater rolls, one of said rolls being a breaker roll and the other of said rolls being a grinder roll, and means for continuously removing formed pulp from said tank before it reaches said grinder roll.

2. The combination with a beating engine comprising a tank through which the water and stock flows, of a plurality of beater rolls arranged in series in said tank, bed plates for said beater rolls, one of said rolls being a breaker roll and the other of said rolls being a grinder roll, and means for removing formed pulp from said tank before it reaches said grinder roll.

3. The combination with a beating engine comprising a tank through which the water and stock flows, of a plurality of beater rolls arranged in series in said tank, bed plates for said beater rolls, one of said rolls being a breaker roll and the other of said rolls being a grinder roll, and means for removing formed pulp from said tank before it reaches said breaker roll.

4. Means for removing formed pulp from a beating engine comprising a rotatably mounted cylinder polygonal in cross section, the sides of which are formed of longitudinally extending bars spaced apart to permit entry of the formed pulp into said cylinder, means in said cylinder for picking up the pulp and discharging it through one end of said cylinder comprising a plurality of radially extending partitions, some of which are cut away adjacent the discharge end of said cylinder to expedite the discharge of pulp, and a water jet for clearing the spaces between said bars.

5. Means for removing formed pulp from a beating engine, comprising a rotatably mounted cylinder polygonal in cross section, the sides of which are formed of longitudinally extending bars spaced apart to permit entry of the formed pulp into said cylinder, means in said cylinder for picking up the pulp and discharging it through one end of said cylinder, and a water jet for clearing the spaces between said bars.

6. Means for removing formed pulp from a beating engine comprising a drum having intake openings through the side thereof and a discharge opening at one end, and means for rotatably supporting said drum comprising a bearing block at each end thereof, a vertical guide for each bearing block, a screw extending vertically of each guide and having thread connections with the corresponding bearing block, and common means for rotating each of said screws.

7. In a device for removing formed pulp from a beating engine, a rotating drum comprising polygonal heads, a plurality of longitudinal bars secured along the periphery of said heads, said bars projecting into recesses into one of said heads and passing through the other head, means for holding said bars in position, and means in said drum for picking up and deflecting the pulp to an opening in one head of the drum.

8. In a machine of the class described, rotatable means for removing pulp from its supporting liquid, said means comprising a pair of heads, one of said heads having recesses and the other holes spaced around the periphery, plates separating said heads, stay bolts extending through said heads, bars insertible through holes in the one head and fitting into the recesses in the other and means for preventing longitudinal movement of said bars.

9. In a beating engine, means for removing pulp from said engine, comprising a rotatable drum, radial partitions fixed therein, some of said partitions being cut away near the discharge end of the drum.

10. In a beating engine, means for removing formed pulp from said engine comprising rotatable rolls, heads in said rolls, said heads having grooves adapted to receive radial partition plates, and having two additional sets of grooves to receive plates, one of said sets of grooves extending outwardly and forwardly and the other set outwardly and rearwardly from the outer end of said partition plate grooves.

In witness whereof, we hereunto subscribe our names this 7th day of September, 1920.

JAMES T. MURPHY.
EDWARD J. RANEY.